United States Patent [19]

Warkentin

[11] Patent Number: 5,215,179
[45] Date of Patent: * Jun. 1, 1993

[54] OFF-LOADING CONVEYING SYSTEM

[76] Inventor: Aaron J. Warkentin, 13551 View Dr., Orange Cove, Calif. 93646

[ * ] Notice: The portion of the term of this patent subsequent to Jul. 9, 2008 has been disclaimed.

[21] Appl. No.: 754,050

[22] Filed: Aug. 30, 1991

Related U.S. Application Data

[63] Continuation of Ser. No. 200,407, May 31, 1988.

[51] Int. Cl.⁵ .................................... B65G 29/00
[52] U.S. Cl. .................... 198/365; 198/372; 209/652
[58] Field of Search ..................... 209/651–654, 209/912, 698; 198/365, 372, 482.1, 779

[56] References Cited

U.S. PATENT DOCUMENTS

| | | |
|---|---|---|
| 1,026,385 | 10/1910 | Dull . |
| 1,846,808 | 2/1932 | Hohn et al. . |
| 2,597,941 | 5/1952 | Long . |
| 3,017,024 | 6/1953 | Mumma . |
| 3,100,571 | 8/1963 | Reck et al. . |
| 3,112,822 | 12/1963 | Meyfarth, Jr. . |
| 3,167,192 | 1/1965 | Harrison et al. . |
| 3,545,614 | 12/1970 | Sheetz . |
| 3,637,066 | 1/1972 | Idskov et al. . |
| 3,750,879 | 8/1973 | Luckett et al. . |
| 3,842,968 | 10/1974 | Owens . |
| 3,930,995 | 1/1976 | Paddock et al. . |
| 3,944,056 | 3/1976 | Feehery, Jr. . |
| 4,031,998 | 6/1977 | Suzuki et al. .................. 198/365 |
| 4,106,628 | 8/1978 | Warkentin et al. . |
| 4,143,751 | 3/1979 | Foster et al. .................. 198/365 |
| 4,148,213 | 4/1979 | Prakken ........................ 73/45.4 |
| 4,351,429 | 9/1982 | Garvey ......................... 198/688 |
| 4,726,898 | 2/1988 | Mills et al. ..................... 209/545 |
| 4,730,719 | 3/1988 | Brown et al. .................. 198/387 |
| 4,961,489 | 10/1990 | Warkentin ..................... 198/365 |
| 5,029,692 | 7/1991 | Warkentin .................... 209/912 X |
| 5,042,637 | 8/1991 | La Vars et al. ............... 198/482.1 X |
| 5,101,982 | 4/1992 | Gentili ......................... 209/698 X |

FOREIGN PATENT DOCUMENTS

| | | |
|---|---|---|
| 1481336 | 1/1969 | Fed. Rep. of Germany . |
| 1401620 | 4/1965 | France . |
| 2186413 | 1/1974 | France . |
| WO8300644 | 3/1983 | PCT Int'l Appl. . |
| WO8908510 | 9/1989 | PCT Int'l Appl. . |
| 482609 | 12/1969 | Switzerland . |
| 664747 | 3/1988 | Switzerland . |
| 478593 | 10/1975 | U.S.S.R. . |
| 573418 | 9/1977 | U.S.S.R. ...................... 198/482.1 |
| 609683 | 6/1978 | U.S.S.R. . |
| 1222497 | 4/1986 | U.S.S.R. . |
| 836518 | 6/1960 | United Kingdom . |
| 1335114 | 10/1973 | United Kingdom . |
| 2033866 | 5/1980 | United Kingdom . |
| 1597229 | 9/1981 | United Kingdom . |
| 2117341 | 10/1983 | United Kingdom . |
| 2143491 | 4/1987 | United Kingdom . |

*Primary Examiner*—Donald T. Hajec
*Attorney, Agent, or Firm*—Lyon & Lyon

[57] ABSTRACT

Off-loading conveyors having endless roller chains to which are mounted bow tie rollers on rods extending laterally from the chain. The bow tie rollers define concavities for receipt of product units to be conveyed and off-loaded at an appropriate station. Off-loading elements are mounted to the chains which include paddles extending to between the bow tie rollers. The off-loading elements include levers which cooperate with an actuation system to pivot the paddles through the concavities to remove product at appropriate stations.

12 Claims, 3 Drawing Sheets

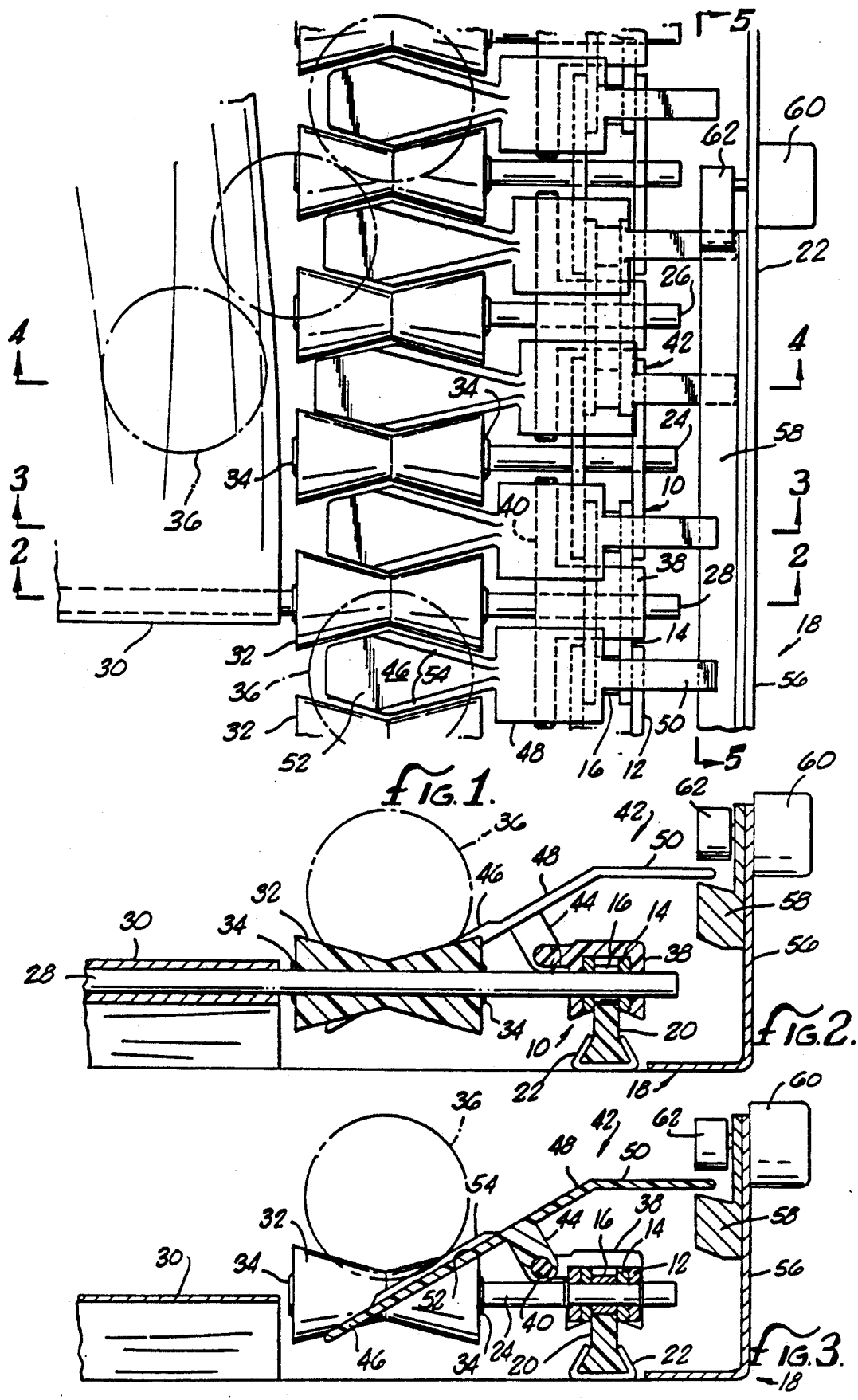

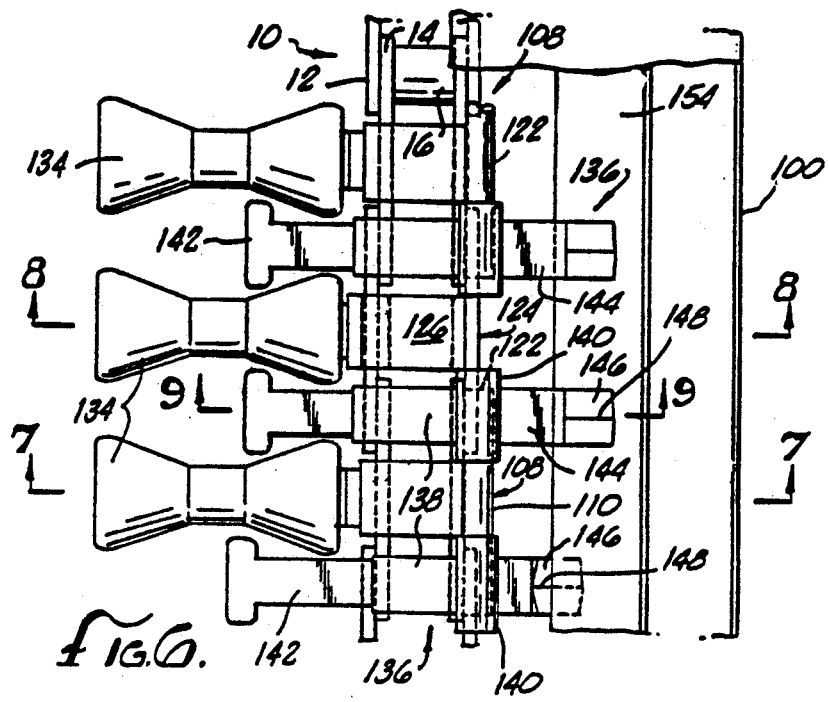
FIG. 6.
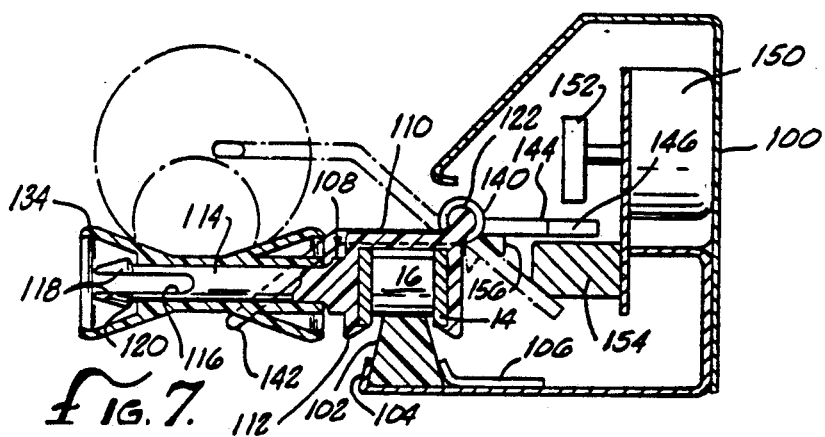
FIG. 7.
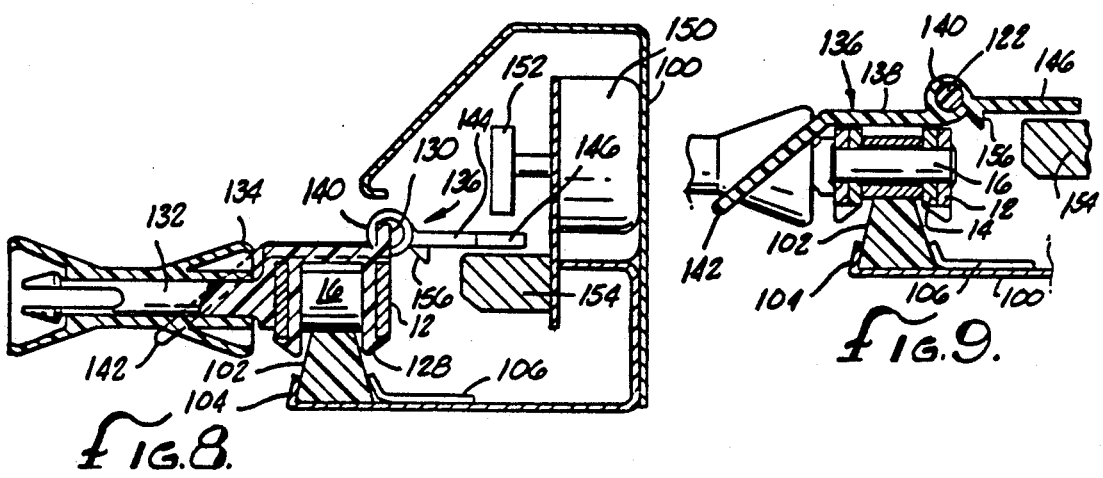
FIG. 8.
FIG. 9.

OFF-LOADING CONVEYING SYSTEM

This is a continuation of application Ser. No. 200,407, filed May 31, 1988.

BACKGROUND OF THE INVENTION

The field of the present invention is conveying systems wherein the conveyor is actively operative to off-load products from the conveying surface.

Product handling activities for the discrimination of product units have long been used, particularly in the food product industry. Such discrimination has been based on size, ripeness, color, blemishes and the like. Until recent times, this activity was generally undertaken by manual labor. The versatility of workers for handling and processing large amounts and varieties of food products has generally been unsurpassed. Such processing systems generally include conveyor passing working stations where workers were able to distinguish and separate product units. Such labor was generally inexpensive and seasonal. However, difficulties in finding experienced seasonal workers and the normal administrative problems associated with the fluctuating work force have long created a need for less labor intensive systems.

In defining the needs for product handling systems, as particularly applied to the food industry, the nature, volume, relative unit cost and variety of products severely inhibit the design of handling equipment. Most food products must be handled with great care to avoid damage. The perishable nature and large batch quantities of products in season makes rapid processing a necessity. The variety of products which must be processed at different times to economically justify a food processing facility places great demand for versatility on the equipment. Thus, a substantial challenge exists in creating handling equipment to replace the versatile human worker.

Recently, high speed electronics and sophisticated software have provided increasing sensing capability for detecting size and condition of individual product units and rapidly activating responsive mechanisms to proceed to handle such products. However, such systems require a more exacting placement of the product units, a separation of product units, proper orientation and reorientation of product units and means for quickly but gently separating units one from another. The demands for such exacting placement, control and operation are orders of magnitude more stringent than for manual processing. Thus, the design of handling systems has resulted in compromises in speed, efficiency and product treatment.

An earlier system for handling of products in a manner acceptable for automatic sorting is disclosed in U.S. Pat. No. 4,106,628 to Warkentin et al. for SORTER FOR FRUIT AND THE LIKE, the disclosure of which is incorporated herein by reference. In this patented device, cups are arranged on a chain conveyor for holding individual product units. Solenoids act to dump selected cups for product separation responsive to discriminating sensing and electronic commands. Other separating systems include devices for batting or blowing selected units from a conveyor.

Another system which has been in use now for some time is disclosed in U.S. patent application Ser. No. 515,313, filed Jul. 18, 1983 entitled PRODUCT HANDLING SYSTEM, the disclosure of which is incorporated herein by reference. In this device, a conveyor is employed which includes elements capable of tipping to off-load individual units of a product being processed. The nature of the conveyor permits some variety in shapes and sizes, including elongated products. However, a range of round or oval products in smaller sizes is not as easily accommodated by this system.

SUMMARY OF THE INVENTION

The present invention is directed to an off-loading conveyor system for the handling of a wide variety of product including small spherical and ovular shapes and easily damaged units. Off-loading elements are arranged in association with a conveyor whereby products of a wide variety of shapes can be off-loaded in a rapid manner without injury. The system lends itself to high-speed processing of a stream of product units compatible with electronic systems control.

In one aspect of the present invention, support elements may be mounted in association with a chain conveying system. The support elements define at least one concavity. Off-loading elements facing the concavity or concavities may be actuated to void the concavity by sweeping therethrough. The operation of the off-loading elements may be achieved by electronic control. The off-loading elements are arranged and pivotally mounted to gently urge the product units from the conveyor.

In another aspect of the present invention, bow tie shaped elements are presented to define support surfaces. The elements define appropriate concavities therebetween which accommodate products in a very wide range of sizes from very small products just spanning the space between elements to large products having a curved surface which barely enters into the concavity. In all cases, the orientation and actuation of the paddle can cause the product to be removed in a specified direction from the conveyor at an appropriate time.

In a further aspect of the present invention, the off-loading system is arranged such that the off-loading elements do not sweep completely through the concavity. Under such circumstances, kinetic energy imparted to the product unit positioned in the concavity is required to fully off-load that unit. Such kinetic energy may be achieved by the motion of the off-loading element. When the product unit is overly ripe, the energy of the off-loading element is not fully transferred to the product unit or is transferred in an unuseful form. This results in the unit remaining on the conveyor. In this way, overripe units may be sorted.

Accordingly, it is an object of the present invention to provide an improved versatile off-loading conveying system. Other objects and advantages will appear hereinafter.

BRIEF DESCRIPTION OF THE DRAWINGS

FIG. 1 is a plan view of an off-loading conveyor of the present invention.

FIG. 2 is a cross-sectional elevation taken along line 2—2 of FIG. 1.

FIG. 3 is a cross-sectional elevation taken along line 3—3 of FIG. 1.

FIG. 6 is a plan view of a second embodiment of the present invention.

FIG. 7 is a cross-sectional elevation taken along line 7—7 of FIG. 6.

FIG. 8 is a cross-sectional elevation taken along line 8—8 of FIG. 6.

FIG. 9 is a cross-sectional elevation taken along line 9—9 of FIG. 6.

DETAILED DESCRIPTION OF THE PREFERRED EMBODIMENT

Figure 4:
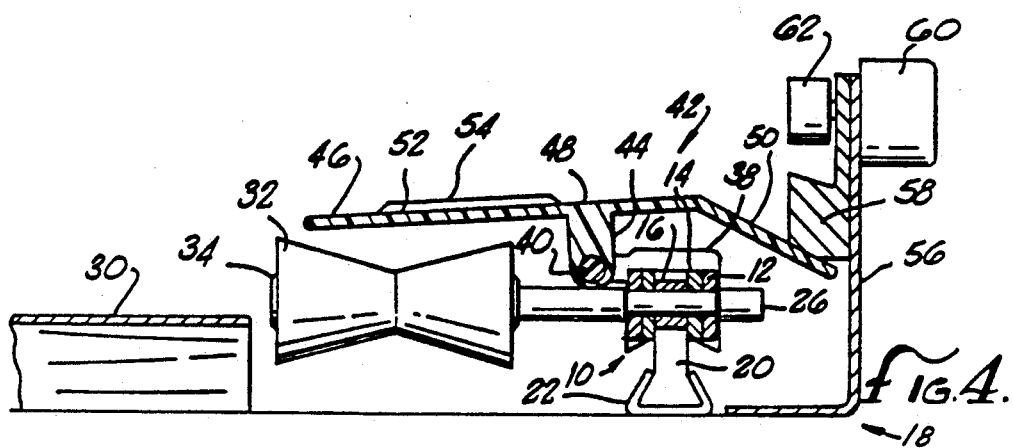
FIG. 4 is a cross-sectional elevation taken along line 4—4 of FIG. 1.

Turning in detail to the drawings, an off-loading conveyor is illustrated as including an endless flexible element provided by a roller chain, generally designated 10. The endless roller chain 10 includes links 12 and 14. The links 12 are made up of parallel link elements as are the links 14. The links 14 are found to have the link elements positioned inwardly of the link elements of links 12. The links 12 and 14 are connected end to end by means of rollers 16 in an overlapping arrangement. The links 12 and 14 are free to rotate relative to one another about the rollers 16 to create the appropriate flexibility in a plane perpendicular to the rollers. Centered in each of the links 12 and 14 is a laterally extending hole. The hole is actually found extending in alignment through both link elements of all links 12 and 14 and centered between the rollers 16.

A support structure 18 includes a frame structure with sprocket wheels (not shown) employed to conventionally mount the endless chain 10. A runner 20 is disposed on the upper portion of the support structure to support and guide the endless roller chain. The runner 20 is positioned on a bracket 22 associated with the support structure. This structure defines a conveying path along which the chain 10 moves. Support units mounted to the chain provide support for conveyed product units.

Rods 24 are shown positioned in the holes in the links 12. They are oriented laterally of the endless roller chain 10 and extend laterally outwardly of the roller chain 10 in a first direction (toward the left as seen in FIG. 1). Similarly, rods 26 are positioned in the holes in the links 14 and extend in a similar manner. An extended rod 28 is periodically positioned in place of a rod 26. This rod extends outwardly to receive a curtain 30.

Mounted on each of the rods 24, 26 and 28 is a support element 32. Bow tie shaped elements 32 may be advantageously employed. In the present embodiment, the support elements 32 are bow tie rollers capable of rotating on the rods and being fixed from moving axially along each of the rods by retaining rings 34. The support elements 32 include supporting surfaces, in this case defined by two abutting truncated conical members. The bow tie shape is advantageous in that the support surfaces created are inclined downwardly from either end to form a trough extending along the conveying path. This trough may receive elongate products which span roller to roller in what may be considered a first concavity. Each support surface, from its centerline, is also inclined downwardly toward the next support element. Adjacent support elements define, by means of these supporting surfaces, additional concavities for holding units of the product. A unit of the product is schematically illustrated by the phantom lines 36. As the units of product are solid, it is unnecessary to define a complete surface to the concavity. The support surfaces of each support element help define, with the adjacent support element, a sufficient supporting surface to accommodate rounded products.

Clamped to the links 14 are mounts 38. The mounts are U-shaped in structure with a locking flange designed to hook under the bottom of each link. Each mount 38 is conveniently of resilient plastic such that the mounts may be easily snapped in place. Each mount 38 has a pivot pin 40 which extends perpendicular to the orientation of the rods. The pin 40 is shown in this embodiment to extend in both directions from the mount to a width approaching the next adjacent rod 24. A hole extends through the mount so as to be in alignment with the laterally extending hole through the link. In this way, the rod 26 or 28 may be positioned in the link.

Positioned on the pivot pins 40 are off-loading elements 42. The off-loading elements 42 are pivotally mounted to the endless roller chain 10 by means of the mounts 38. Each off-loading element 42 includes a mounting portion 44 having a hole therethrough. The hole receives the pivot pin 40 such that the off-loading element 42 is pivotally mounted to a mount 38. The mounting portion 44 extends upwardly to provide height above the chain 10. Each off-loading element 42 also includes a paddle 46, a base portion 48 and a lever 50. The base portion 48 presents a broad flat section corresponding to the length of the mounting portion 44.

Extending from one end of the base portion 48 is the paddle 46. The paddle extends to pivot through the concavity between adjacent support elements 32. The paddle 46 is inclined downwardly away from the chain 10 to face the concavity in a retracted position. This retracted position can be seen, for example, in FIG. 2. The paddle 46 is laterally displaced from the axis defined by the pin 40 toward the concavity and extends downwardly as well as outwardly away from the pin 40. When the paddle 46 is actuated to pivot outwardly, the downward incline presents a horizontal component of force against the product unit so as to insure movement of the unit laterally from the conveyor directly away from the pin 40. The arrangement of the paddle is such that even with the off-loading element 42 pivoted to a position at the upper extent of the rollers, as seen in FIG. 4, the paddle portion still is inclined downwardly away from the roller chain 10. Further, the paddle 46 extends substantially the whole distance across the concavity. In this embodiment, the paddle is designed to insure off-loading of all product units upon actuation of the paddle 46.

The paddle 46 includes a concave surface facing the concavity between the support elements 32 in the retracted position. This concave surface is defined by a planar surface 52 and two upstanding ribs 54 bordering the planar surface on either side of the paddle 46. The concave surface in the preferred embodiment is arranged to closely fit within the concavity between the support elements 32, in this case the bow tie rollers. Consequently, the surface includes a diverging portion associated with a converging portion as seen moving in a direction away from the chain 10. The diverging portion includes the upstanding ribs 54 at the opposed borders. The converging portion does not include ribs. Product units may then freely move across the converging portion surface and off of the conveyor.

The lever 50 extends away from the base portion in the opposite direction from the paddle in the preferred embodiment. Naturally, this lever 50 may extend in any convenient direction so as to avoid interference with the product units. Through this lever 50, the pivotal orientation of the off-loading element 42 may be controlled so as to allow placement or induce removal of product units from the concavity defined by the support elements 32.

Figure 5:
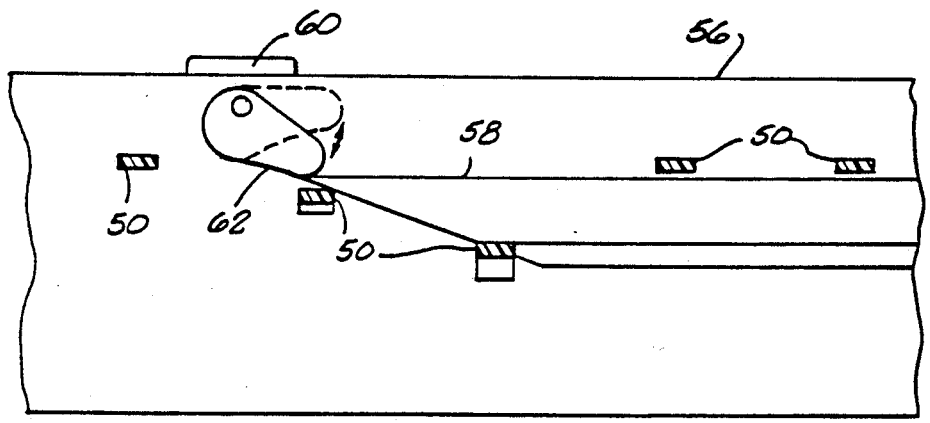
FIG. 5 is a cross-sectional elevation taken along line 5—5 of FIG. 1.

To control the off-loading elements 42 by means of the lever 50, the support structure 18 includes an upstanding mounting member 56. The mounting member 56 supports a ramp 58. The ramp 58 is arranged as can best be seen in FIG. 5. The path of the levers 50 moving with the chain 10 is normally above the ramp. Consequently, the ramp 58 does not cause any operation of the off-loading elements 42 which are allowed to pass over the top thereof. A solenoid 60 is also mounted to the mounting member which includes a rotatable arm 62. The arm 62 pivots as seen in FIG. 5 to interfere with the path of travel of the levers 50 of the off-loading elements 42. When the solenoid arm 62 is caused to rotate downwardly, the lever moves downwardly when encountering the arm 62. The off-loading element 42 associated with this lever 50 is caused to rotate to a certain extent upwardly into the concavity between supporting elements 32. This rotation results in the lever 50 engaging the ramp 58 and being driven downwardly to a fully pivoted position. This fully pivoted position is illustrated in FIG. 4. By this operation, the product unit is displaced from the concavity of the conveyor and off-loaded onto a curtain 30. A plurality of ramps 58 and solenoids 60 with arms 62 may be arranged along the conveyor path to provide a plurality of off-loading stations.

In the operation of this first embodiment, the endless roller chain 10 is driven in a conventional manner by a motor about sprocket wheels. On the upper pass of the chain, it rides along a straight conveying path defined by the runner 20. Product units are deposited on the conveyor such that they become positioned in the concavities between supporting elements 32. A means for sensing size, shape, color or other attribute may then view the product units once placed on the conveyor. The motion of the chain is indexed such that when the sensed product unit reaches the desired place for off-loading, the solenoid 60 is actuated. Actuation of the solenoid 60 causes the arm 62 to rotate into the path of travel of the appropriate lever or levers. This causes the levers to ride downwardly across the underside of the arm 62 and the associated ramp 58. In turn, the off-loading element 42 associated with each actuated lever 50 is pivoted such that the associated paddle or paddles 46 swing upwardly through the conveyor to off-load product units onto the adjacent curtain. The products are softly deposited on the curtain by virtue of its flexibility and softness. The product unit then rolls from the curtain into the appropriate container, shoot, bag or other arrangement. In this way, product units may be separated by appropriate physical attribute.

Turning next to the second embodiment illustrated in FIGS. 6 through 9, an off-loading conveyer is again illustrated including the endless roller chain previously designated 10 in association with the first embodiment. The holes referred to as extending through the links 12 and 14 need not be present in this chain. Of course, they may be present but provide no function in this second, preferred embodiment.

A support structure 100 is employed with this second embodiment which includes a general frame structure with sprocket wheels (not shown) employed to conventionally mount the endless chain 10. A runner 102 of low friction plastic material or the like is held in place on the support structure 100 by a flange 104 and a bracket 106. The runner 102 is shown to be a trapezoid in cross section such that the base of the runner 102 is dovetailed into the converging flange 104 and spaced brackets 106. The upper end of the runner 102 is shown to support the chain 10 on the rollers 16. With the conventional sprockets and the runner 102, the chain 10 is constrained to move uniformly along a conveying path thus defined by the support structure 100.

Support elements are mounted to the chain 10 to define the conveying mechanism. These elements include two types of roller mounting brackets. A first type of roller mounting bracket 108 is shown mounted to the links 14. The roller mounting brackets 108 each include a U-shaped mounting base 110 which is forced over the links 14 into a interlocked position. The legs of the mounting base 110 have inwardly extending locking flanges 112 to engage the underside of the links 14 as can best be seen in FIG. 7. As can best be seen in FIG. 6, each mounting base 110 is sufficiently narrow to fit between the links 12 when in position on a link 14. To one side of each mounting base 110 of the roller mounting brackets 108 is a rod 114. The rod 114 is shown in this embodiment to be integrally formed with the mounting base 110. The rod extends laterally from the mounting base 110 in a direction which is perpendicular to the longitudinal direction of the chain. Each rod 114 includes a resilient locking end having a center channel 116 to define two locking fingers 118 with flanges 120 extending outwardly from the barrel of the rod 114. From the flanges 120, the ends are tapered toward one another for easy insertion and difficult retraction of the rod 114 when inserted into a cylindrical hole.

Also forming part of the roller mounting brackets 108 are pivot pins 122 which extend along the conveying path of the chain 10. Each pin 102 is shown to extend in both directions from the mounting base 110. In this embodiment, the pins 122 are located to the other side of the chain from the rods 114 on the mounting base 110. Each mounting base 110, rod 114 and pin 122 is preferably molded of high impact plastic material.

The second type of support elements are fixed to the links 12 between each of the mounting brackets 108. These elements form mounting brackets 124 and also include a mounting base 126. The mounting base 126 is U-shaped and extends to engage the chain. The legs of the base include locking flanges 128 which extend outwardly to engage the links 12. The links 12 are wider than the links 14 and it has been found convenient to provide the roller mounting brackets 108 about the outer side of the narrower links 14 and the roller mounting brackets 124 inwardly of the broader links 12. This second mounting arrangement is best illustrated in FIG. 8. The upper surface of the mounting base 126 includes an upstanding flange 130 in approximate alignment with the pivot pins 122. Extending outwardly from one side of each of the mounting bases 126 is a rod 132. The rods 132 have the same end treatment as each rod 114. Both the rods 114 and 132 may periodically include an extended rod so as to receive a curtain such as curtain 30 illustrated in the first embodiment.

Mounted on the rods 114 and 132 are bow tie shaped elements 134 which are shown here to be rollers preferably rotatable on the rods 114 and 132 but may be fixed in the circumstances where large products are found to span the rollers and move axially along the chain. The bow tie shape is in reference to the upper surface. If the elements do not rotate, they need only have the upper surface as the undersides do not contribute to the formation of concavities useful to receiving product. With the rollers 134 rotatable, a runner may come into contact with the underside of the rollers 134 for a specified length along the conveyor path. This would allow the product to be rotated a specified amount on the conveyor. The rollers 134 define an elongate concavity and concavities between rollers as discussed with regard to the first embodiment.

Arranged to either side of each roller mounting bracket 108 on the extending pivot pins 122 are off-loading elements 136. The off-loading elements 136 include a base portion 138 containing a mounting cylinder 140. The mounting cylinder 140 is sized to fit about an end of one of the pivot pins 122. The mounting cylinder 140 is shown to ride up against the mounting base 110 of the first roller mounting bracket 108. At the other end of the mounting cylinder 140, it comes up against the aligned upstanding flange 130. Thus, the off-loading elements 136 are retained on the pins 122. The off-loading elements 136 each include a paddle 142 extending from the base portion 138. The paddle 142 extends to a retracted position below the concavity defined by the bow tie rollers 134. The paddle 46 is laterally displaced from the axis defined by the pin 40 toward the concavity and extends downwardly as well as outwardly away from the pin 40. In this embodiment, the paddle 142 terminates in a widened portion designed to clear the bow tie roller 134 at the center of the concavity. The pivotal action of the paddle 142 through the concavity from the retracted position is seen in full and phantom in FIG. 7.

The extent of travel of the paddle in this embodiment is shown to sweep through only a portion of the concavity such that product units below a certain size are not positively displaced from the concavity. Consequently, if sufficient kinetic energy is not imparted to the product unit by the paddle 142, the unit will return to a position on the concavity when the paddle is returned to its lower, retracted position. The operation and effect of this arrangement will be discussed further below.

Extending from the base portion 138 in the opposite direction from the paddle 142 is a lever 144. Again, the lever 144 may extend in any convenient direction which does not interfere with the product units. Control of the paddle 142 is accomplished by use of the lever 144. The lever 144 is shown to include a sloped ramp portion 146 rising from either side to a ridge line 148.

Actuation of the off-loading elements 136 is accomplished in a manner substantially the same as with the first embodiment. The support structure 100 is shown to support a solenoid 150 having a rotatable actuator 152. A ramp 154 is arranged in association with the solenoid 150 on the support structure 100 such that the levers 144 will pass therebetween. When the solenoid 150 is actuated, however, the actuator 152 encounters the lever 144 and rotates the lever downwardly to engage the ramp 154. Once the ramp is engaged, movement of the lever 144 with the chain 10 causes the off-loading element 136 to rotate to its fully rotated position to run along the ramp for a predetermined length. The off-loading element 136 is then released to return to its rest position. As the paddle 142 weighs more than the lever 144, the rest position is with the paddle in the lowermost, or retracted, position. A stop 156 limits the rotation of the off-loading element 136 by coming into contact with one side of the mounting base 110.

In the operation of this second embodiment, the basic process of the first embodiment is again realized. Naturally, the size of the bow tie rollers 134, the size and shape of the paddles 142 and the angularity and extent of the ramp 154 all may be designed to accommodate specific product. The angulation of the ramp, as best seen in FIG. 5 in association with the first embodiment, and the speed of the chain 10 determines the acceleration forces placed on product units in removing them from the concavities defined by adjacent bow tie rollers 134. By having the pivot axes of the off-loading elements 136 displaced laterally a substantial extend from the surfaces of the paddles 142 as shown in this embodiment and/or by having the paddles extend only partially through the concavities when pivoted, the paddles tend to roll the products from the concavities rather than throw them. This action is most beneficial with easily damaged product.

Through adjustment by empirical testing, an arrangement with chain speed and ramp angle can be achieved with this second embodiment, where the paddles do not extend across the concavity, such that overly ripe product units will absorb a sufficient amount of the paddle energy that these products will not move fast enough, or have sufficient energy, to be discharged from the conveyor. At the same time, harder units would be moved from the conveyor by translating paddle motion into sufficient kinetic energy to lift the product clear. Thus, in addition to the employment of some sensing mechanism to move product units from the conveyor at selected positions, the physical properties of the product units themselves may also result in programed separation.

Peripheral devices and processes known in the industry are intended to be incorporated with the present system. A guide mechanism 158 is shown as part of the support structure 100 to define the lateral extent of the conveying path. Similar guide mechanisms may be employed as needed on the other side of the conveyor as well. Feeding to the conveyor may be accomplished by a plurality of mechanisms. One such mechanism is to employ a flume of water defined by a narrowing channel. As the channel narrows, the product units may be singulated and sped up to the approximate velocity of the conveyor. The flume may then simply discharge onto the top of the conveyor such that product units are gently placed thereon for processing.

The curtain system as provided by the curtains 30 is but one mechanism for handling off-loaded product units. Simple slots or guideways may be provided with or without the curtain members. Selected units discriminated by size, color or other physical attribute may be off-loaded at any particular station in conjunction with a ramp 58 or 154. Naturally one of the off-loading stations can simply be the end of the chain conveyor where the chain proceeds around the sprocket.

Thus, off-loading conveyors are disclosed which accommodate specific product units of a wide variety of sizes and shapes for conveying and off-loading in a rapid and efficient manner. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An off-loading conveyor of product units, comprising a support structure defining a conveying path;

an endless flexible element mounted on said support structure to extend along said conveying path and including mounts thereon;

support elements mounted to said endless flexible element, said support elements being mutually spaced apart and including support surfaces defining concavities between adjacent said support elements;

off-loading elements movably mounted on said endless flexible element to said mounts, respectively, and extending to between adjacent said support elements, respectively, each said off-loading element having a path of travel to off-load a product unit directly away from said endless flexible element without the product traveling over a said mount.

2. The off-loading conveyor of claim 1 wherein said endless flexible element is a chain.

3. The off-loading conveyor of claim 1 wherein said support elements are rollers rotatably mounted to said endless flexible element.

4. The off-loading conveyor of claim 1 further including actuators mounted to said support structure, each said actuator including a selectively movable element having a cam surface movable into the path of travel of said off-loading elements to move selected said off-loading elements into said concavities, respectively.

5. An off-loading conveyor of product units, comprising a support structure defining a conveying path;

an endless flexible element mounted on said support structure to extend along said conveying path;

support elements mounted to said endless flexible element, said support elements being mutually spaced apart and including support surfaces defining concavities between adjacent said support elements;

pivots mounted on said endless flexible element and defining pivot axes;

off-loading elements mounted on said pivots, respectively, and extending to between adjacent said support elements to pivot into said cancavities to off-load product units away from said pivots.

6. The off-loading conveyor of claim 5 wherein said endless flexible element is a chain.

7. The off-loading conveyor of claim 5 wherein said support elements are rollers rotatably mounted to said endless flexible element.

8. The off-loading conveyor of claim 5 further including actuators mounted to said support structure, each said actuator including a selectively movable element having a cam surface movable into the path of travel of said off-loading elements to pivot selected said off-loading elements about said pivot into said concavity.

9. On off-loading conveyor of product units, comprising a support structure defining a conveying path;

an endless flexible element mounted on said support structure to extend along said conveying path;

support elements mounted to said endless flexible element, said support elements being mutually spaced apart and including support surfaces defining concavities between adjacent said support elements;

pivots mounted on said endless flexible element and defining pivot axes;

off-loading elements mounted on said endless flexible element and including paddles fitting through said concavities between adjacent said support elements, each said paddle having a free end, being pivotally mounted about a said pivot displaced from said free end, respectively, and having a retracted position inclined downwardly toward the free end of said paddle and facing a said concavity, each said off-loading element being aligned for passage of said paddle from said retracted position into said concavity, the surface of said paddle facing said concavity and being displaced upwardly to off-load away from said flexible element.

10. The off-loading conveyor of claim 9 wherein said endless flexible element is a chain.

11. The off-loading conveyor of claim 9 wherein said support elements are rollers rotatably mounted to said endless flexible element.

12. The off-loading conveyor of claim 9 further including actuators mounted to said support structure, each said actuator including a selectively movable element having a cam surface movable into the path of travel of said paddles to pivot selected said paddles about said pivot into said concavity.

* * * * *